116,121

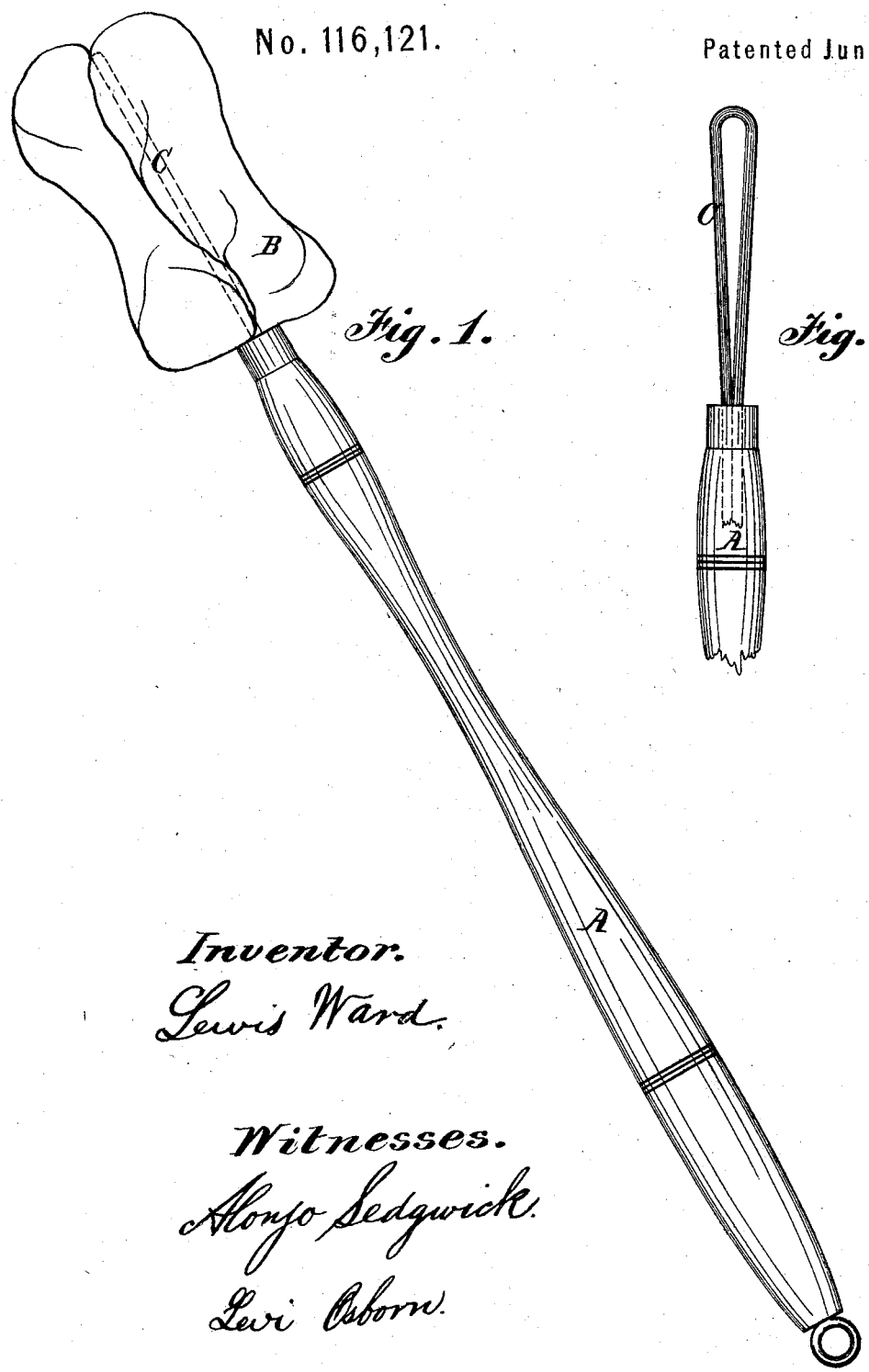

UNITED STATES PATENT OFFICE.

LEWIS WARD, OF POUGHKEEPSIE, NEW YORK.

IMPROVEMENT IN LAMP-CHIMNEY CLEANERS.

Specification forming part of Letters Patent No. 116,121, dated June 20, 1871.

*To all whom it may concern:*

Be it known that I, LEWIS WARD, of Poughkeepsie, in the county of Dutchess and State of New York, have invented a Lamp-Chimney Cleaner, of which the following is a specification:

My invention is a simple utensil for cleaning lamp-chimneys. It consists of a sponge attached, by means of a staple, to a wooden handle. The object of my invention is to make use of the elasticity of the sponge for the purpose of conforming the cleaner to the irregularities of the chimney in place of using springs or other devices for that purpose. It leaves no lint on the glass, and, when used, can be cleaned by being thoroughly washed out without injury, thus being better for the purpose than either cloth, springs, or chamois.

In order to describe my invention more fully I will refer to the accompanying drawing.

Figure 1 is a perspective view of my invention. Fig. 2 shows the staple and the manner of its insertion in the handle.

B is the sponge attached, by means of the staple C, to the handle A.

What I claim as my invention, and desire to secure by Letters Patent, is—

The combination of the staple C with the sponge B and the handle A, as and for the purpose specified.

LEWIS WARD.

Witnesses:
    ALONZO SEDGWICK,
    GEORGE PARKER.